Patented Jan. 12, 1943

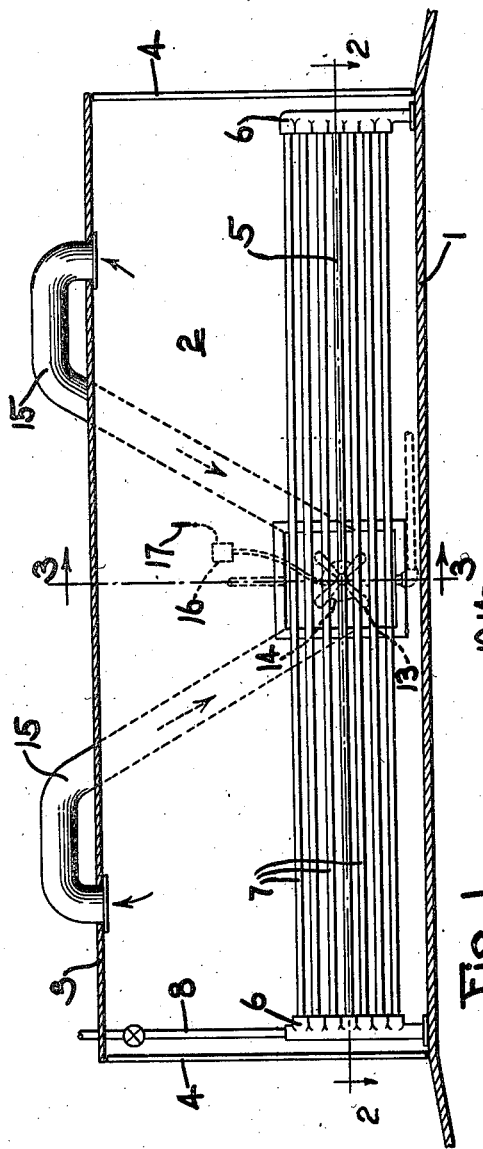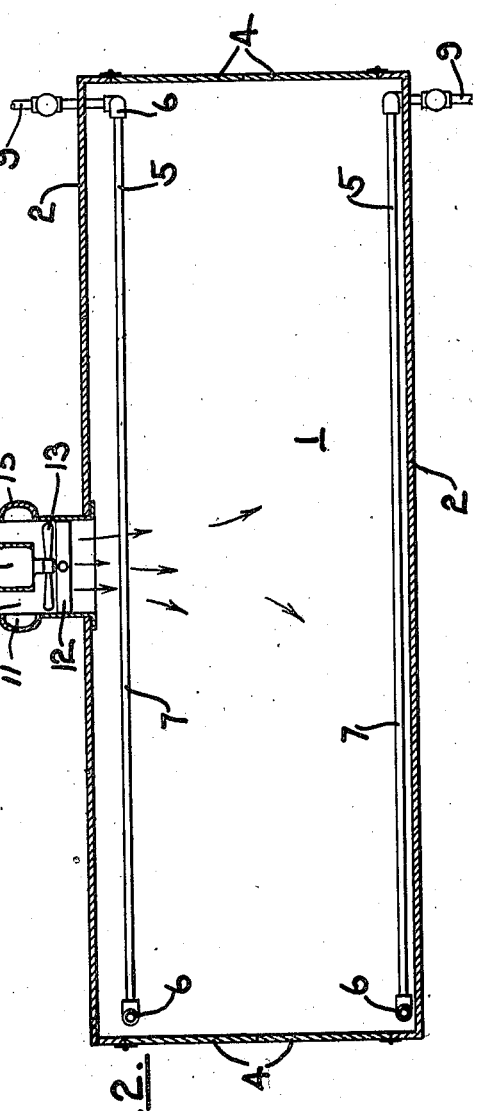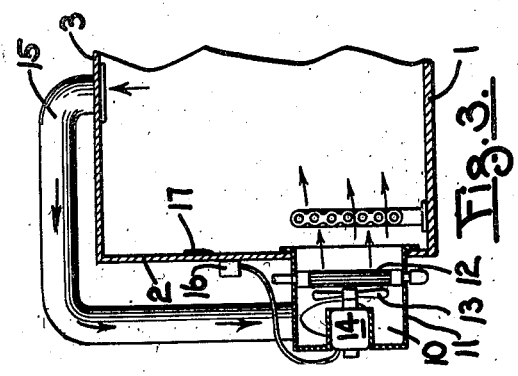

2,308,332

UNITED STATES PATENT OFFICE 2,308,332

HEATING SYSTEM FOR DRY KILNS

Robert W. Irwin and Cornelius M. Herz, Grand Rapids, Mich., assignors to Irwin Equipment Company, Grand Rapids, Mich., a corporation of Michigan Application December 2, 1940, Serial No. 368,136

2 Claims. (Cl. 34—54)

This invention relates to a heating system for dry kilns. The device is particularly intended for heating elongated chambers used to dry the finish on furniture or the like wherein it is desired to maintain a closely uniform temperature and also circulation of air.

It has been the practice to heat dry kilns with steam heating radiators having capacity to heat the chamber to a higher degree than desired and an attempt has been made to maintain a uniform temperature by intermittently admitting steam to the radiators and controlling the admission of steam by a thermostat located in the chamber which would automatically stop admission of steam to the radiator when the temperature reached the desired degree and to again admit steam to the radiator when the temperature dropped below the desired degree. The difficulty with this system has been that the lag in both cooling and heating the radiator when the steam was either shut off from it or admitted to it resulted in a wide variation of temperature. When the radiator had become heated it would continue hot and would radiate heat after the steam was shut off thus overheating the chamber. Then, when the room temperature dropped below the desired degree it would require a considerable time to heat the radiator after the steam was admitted to it so that the room temperature would drop considerably below normal.

The object of this invention is to overcome the difficulties that have been experienced and to maintain a substantially uniform temperature by utilizing a constantly heated radiator in the kiln chamber which will have insufficient capacity to heat the chamber to the desired temperature and to combine with it an instantaneously operative auxiliary heater with a forced air circulator automatically controlled by a thermostat which will both raise the temperature to the desired degree and maintain it there and also provide the desired air circulation in the chamber.

The invention is hereafter more fully described and particularly pointed out in the claims, reference being had to the accompanying drawing, in which, Fig. 1 is a longitudinal sectional elevation of a dry kiln having the heating system applied thereto.

Fig. 2 is a longitudinal sectional plan of the same on the line 2—2 of Fig. 1, and Fig. 3 is a fragmentary transverse sectional elevation on the line 3—3 of Fig. 1.

Like numbers refer to like parts in all the figures.

1 represents the floor of the dry kiln, 2 the vertical side walls, 3 the top and 4 the end doors thereof all constituting a completely enclosed chamber.

Elongated steam heating radiators 5 are located along the walls of the chamber and are of conventional style having headers 6 at each end connected by pipes 7 and steam supply and return pipes 8 and 9 are connected with the headers in the customary way. During operation steam is constantly supplied to the radiators 5 and they are constantly hot and dissipate their heat by radiation and convection but the capacity of the radiators 5 is slightly insufficient to raise and maintain the temperature within the chamber to the desired degree.

An auxiliary heater 10 is provided which includes a housing 11 communicating through one side of the kiln near the bottom thereof. A radiator 12 is located in the housing 11 but out of heat radiating and convecting relation with the kiln chamber. A circulating fan 13 driven by a motor 14 is located in the housing 11 adjacent the radiator 12 and conduits 15 communicate with the top of the kiln chamber and the interior of the housing 11. When the fan 13 is in operation air is circulated from the top part of the kiln chamber, where it is warmest, downward through the housing 11 and through the auxiliary radiator 12 and thence into the lower part of the kiln chamber. Operation of the motor 14 is controlled by a conventional switch 16 actuated by a thermostat 17 subjected to the kiln chamber temperature. The thermostat and thermostat actuated switch are of conventional well-known construction and form no part of this invention per se.

During operation of the kiln the auxiliary radiator 12 may be kept constantly hot if desired or it may be intermittently heated and controlled by a thermostat. If constantly hot it is in such position relative to the kiln chamber that its heat will not be dissipated by either radiation or convection when the fan 13 is not operating. When the room thermostat 17 calls for heat the switch 16 will be closed and the motor and fan 14 and 13 will instantly commence operation and will circulate air through the auxiliary radiator 12 immediately commencing to increase the room temperature. When the room temperature reaches the desired degree and the thermostat 17 is satisfied the switch 16 will be opened and the motor and fan will immediately stop operation ceasing further dissipation of the heat from the auxiliary radiator 12 into the kiln chamber.

By this means with a constant supply of heat of nearly sufficient capacity to raise the temperature to the desired degree and with an auxiliary heat source immediately available the room temperature may be very accurately maintained at the desired degree.

As a modification of this invention it has been found that circulation of air through the radiators 5 will increase their heating capacity or in other words, forced circulation of air past the pipes 7 will increase their dissipation over that which occurs by mere radiation and convection. Therefore, if the radiators 5 have a capacity somewhat insufficient to heat the kiln to the desired temperature when dissipating their heat by convection and radiation only forced circulation of air past them, without the use of auxiliary heating source, will increase their heating capacity and will tend to increase the room temperature. In this phase of the invention the thermostatically controlled motor and fan 14 and 13 may be used to control room temperature without the auxiliary radiator 12. Furthermore, taking air from the top part of the kiln chamber where it is hottest and circulating it into the lower part of the kiln chamber also tends to distribute the heat more evenly in the parts of the chamber where the heated air is used and in that part where the thermostat 17 is located.

The invention is defined in the appended claims and is to be considered comprehensive of all forms of structure coming within their scope.

We claim:

1. The combination with a kiln chamber of a constantly operated heating element of insufficient capacity to maintain the desired temperature by radiation and convection and an auxiliary heating element located out of heat radiating position relative to said kiln chamber and thermostatically controlled intermittently actuated means for circulating air past said auxiliary heating element into said kiln chamber.

2. The elements defined in claim 1 combined with a conduit for conducting air circulated by said circulating means from the top of the kiln chamber into the lower part thereof.

ROBERT W. IRWIN.
CORNELIUS M. HERZ.